(12) United States Patent
Mae et al.

(10) Patent No.: US 7,727,475 B2
(45) Date of Patent: Jun. 1, 2010

(54) MICRO CHEMICAL APPARATUS

(75) Inventors: Kazuhiro Mae, Kyoto (JP); Shinji Hasebe, Kyoto (JP); Nobuaki Aoki, Kyoto (JP); Hideo Wakami, Suita (JP); Hideharu Nagasawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1315 days.

(21) Appl. No.: 10/858,407

(22) Filed: Jun. 2, 2004

(65) Prior Publication Data
US 2005/0100481 A1 May 12, 2005

(30) Foreign Application Priority Data
Jun. 3, 2003  (JP) ............................... 2003-158381

(51) Int. Cl.
*B01L 3/02* (2006.01)
(52) U.S. Cl. ..................................................... 422/100
(58) Field of Classification Search .................. 422/100
See application file for complete search history.

(56) References Cited
U.S. PATENT DOCUMENTS
4,737,268 A * 4/1988 Giddings ................... 209/12.2
4,894,146 A * 1/1990 Giddings ................... 209/12.2
5,039,426 A * 8/1991 Giddings ..................... 210/695

FOREIGN PATENT DOCUMENTS

| JP | 2001-091497 | | 4/2001 |
| JP | 2001-515216 | | 9/2001 |
| JP | 2001-281233 | | 10/2001 |
| JP | 2002-282682 | A | 10/2002 |
| JP | 2003-502144 | A | 1/2003 |
| WO | WO 00/78438 | A1 | 12/2000 |
| WO | 01/89693 | A1 | 11/2001 |
| WO | WO 0211888 | A2 * | 2/2002 |

* cited by examiner

*Primary Examiner*—Walter D Griffin
*Assistant Examiner*—Bobby Ramdhanie
(74) *Attorney, Agent, or Firm*—Sughrue Mion, PLLC

(57) ABSTRACT

In a micro chemical apparatus, guide walls as physical barriers are provided at a region where fluid A and fluid B as unmixed raw materials and a product are discharged so that, when the fluid A and the fluid B as raw materials are charged, only the portion in which the fluid A and the fluid B are mixed and allowed to react with each other by molecular diffusion of the raw materials is discharged. As a result, only the product is in the range between the two guide walls, and the product can be selectively taken out of the outlet.

4 Claims, 13 Drawing Sheets

MICRO CHEMICAL APPARATUS

BACKGROUND OF THE INVENTION

1. Field of the Invention

The present invention relates to a micro chemical apparatus which is used as a component to perform mixing or a reaction involving mixing in the equipment for producing materials and products using the mixing or a reaction involving mixing of fluids in the fields of chemical industry, pharmaceutical industry and the like, or for analyzing diffusion coefficients and reaction rate constants of target materials in the field of analytical instrument industry. More particularly, the present invention relates to a micro chemical apparatus in which a plurality of fluids are introduced into a channel to perform mixing or a reaction involving mixing (hereinafter referred to as a mixing/reaction channel) through each supply port; the fluids are allowed to flow in the mixing/reaction channel as thin-layer flows; and as a result, the fluids are mixed with each other or allowed to mix and react with each other.

2. Description of the Related Art

A micro chemical apparatus, which is characterized by a small apparatus size and a large surface area per unit volume, has advantages such as excellent heat transfer performance in material, safety and reduction of sample consumption. From these advantages, the micro chemical apparatus is useful for producing chemical products and for using it as a device for determining reaction rate constants and for chemical synthesis.

As shown in FIG. 13A, a conventional micro chemical apparatus 101 has a structure with a channel 102 surrounded by a side wall 103, comprising two entrances and one exit. Fluid A and fluid B as raw materials are charged into the micro chemical apparatus 101 from raw material inlet ports 105a and 105b. The fluid A and the fluid B as unmixed raw materials and a product are discharged from an outlet port 106. More specifically, the fluid A as a raw material is charged from the raw material inlet port 105a. The fluid B as a raw material is charged from the raw material inlet port 105b. The reference numeral 104 designates a supply wall.

Japanese Patent Application Publication No. 2002-282682 discloses an example of a micro chemical apparatus provided with two entrances and two exits. A reaction channel is formed to have an inner diameter of 100 μm or less, which is within the range where a laminar flow condition can be maintained. However, it has not a structure in which the shape or the like of an outlet port can be changed.

National Publication of International Patent Application No. 2003-502144 discloses an example of a micro chemical apparatus for mixing or diffusing two fluids.

Wolfgang Ehrfeld, Volker Hessel Holger Lowe, "Microreactors—New Technology for Modern Chemistry—", WILEY-VCH Verlag GmbH, March 2000, p. 64-65 describes a single mixer available from IMM (Institute of Microtechnology Mainz) GmbH, which is an example of a micro chemical apparatus for mixing or diffusing two fluids.

SUMMARY OF THE INVENTION

Above described conventional micro chemical apparatuses have a problem that it is difficult to selectively take out high purity products or reaction products.

A micro chemical apparatus, which performs mixing or a reaction involving mixing in a micro space, is characterized not by a conventional mixing by a turbulent flow, but by a mixing by molecular diffusion of reactants in an ordered flow due to a laminar flow. Specifically, the total time for the completion of mixing and reaction involving mixing of the fluids introduced depends on the width and the length of the mixing/reaction channel because it depends on the rate of molecular diffusion thereof in the direction orthogonal to the flow.

In a conventional micro chemical apparatus, the fluids introduced into the mixing/reaction channel are subjected to mixing and reaction involving mixing depending on the characteristics such as diffusion rate and reaction rate of the fluids. Accordingly, there are problems depending on operating conditions such as the flow rate for treating raw materials. In some cases, the product to be taken out may contain unreacted materials, as shown in FIGS. 13A and 13B. Or in other cases, when sufficient time for reacting all of the raw materials is provided, mixing or a reaction involving mixing which occurred in the initial stage of the channel may sequentially proceed to result in a non-uniform product. When unreacted materials are contained in the product, they may be mixed or allowed to react with the product after they are discharged from the micro chemical apparatus. As a result, a desired product may not be obtained.

Referring to FIG. 13A, the fluid A spreads to regions a and b by molecular diffusion. The fluid B spreads to regions b and c by molecular diffusion. As a result, all of the unmixed/unreacted fluid A, the product, and the unmixed/unreacted fluid B are discharged from the outlet port 106.

The present invention has been created in view of the above described problems, and the object of the present invention is to provide a micro chemical apparatus capable of selectively taking out a desired high purity product or reaction product.

In order to solve the above described problems, the micro chemical apparatus according to the present invention comprises a micro chemical apparatus for performing mixing or a reaction involving mixing of raw materials utilizing the phenomenon that raw materials diffuse by molecularly diffusion while they are traveling, comprising:

a channel which is surrounded by a wall and in which raw material inlet ports and outlet ports are formed; and guide walls provided in the above described channel so that the composition of each material to be discharged passing through each outlet port formed in the above described channel is different for every outlet port depending on a material distribution in a plane perpendicular to the direction of travel of raw materials in the above described channel in order to form physical barriers at a region where the material distribution is generated, wherein the plane perpendicular to the direction of travel of raw materials is divided into two or more by the above described guide walls as the outlet ports.

When mixing or a reaction involving mixing of materials is performed using the phenomenon that the materials diffuse by molecularly diffusion while they are traveling according to the above described construction, the composition of the materials is not uniform, but a material distribution is present in the plane perpendicular to the direction of travel of the raw materials. Therefore, here, it is made possible to take out each composition separately by positioning guide walls as physical barriers to divide the outlet port into two or more so that each outlet port has different composition.

For example, when a raw material A and a raw material B are mixed and allowed to react with each other to obtain a product C, a guide wall may be provided at a position where B will not be mixed with C because A may be mixed with C if the later separation of A from C is easy.

Therefore, a product containing less proportion of or no raw materials can be discharged from a discharge channel allocated for taking out a product.

Thus, a desired high purity product or reaction product can be selectively taken out.

A micro chemical apparatus according to the present invention is characterized in that the tip of the above described guide wall has a tapered shape in addition to the above described construction.

The tip of the above described guide wall has a tapered shape according to the above described construction.

For example, the shape is a triangle. In addition, for example, the tip has a shape formed by scooping out cylindrical parts.

Therefore, the tip can effectively prevent the materials to be discharged from traveling in the directions different from expectations when they are brought into contact with the thickness part of a guide wall. Accordingly, it is possible to more effectively separate the materials to be discharged from each other, in addition to the effect by the above described construction.

Moreover, a micro chemical apparatus according to the present invention is characterized by comprising a temperature control part for maintaining the temperature of raw materials or a product traveling in the micro chemical apparatus at a desired temperature, in addition to the above described construction.

The above described construction can maintain the temperature of raw materials and a product traveling in a micro chemical apparatus at a desired temperature.

Therefore, the temperature of raw materials or a product traveling in a micro chemical apparatus can be maintained at a desired temperature. Accordingly, in addition to the above described effect, a product with a constant composition can always be obtained from a discharge channel even in the case of mixing or a reaction involving mixing in which a material distribution changes with temperature.

In the micro chemical apparatus according to the present invention, a plurality of guide walls are provided in the down stream of a mixing/reaction channel to split the fluids in the mixing/reaction channel. The micro chemical apparatus can be configured so that not only a desired product is taken out, but also unreacted compounds and unmixed raw materials can be recovered for reuse by changing the shape, number and position of the guide walls, irrespective of operating conditions such as reaction to be applied or flow rate. As a result, a high purity product or reaction product can be selectively taken out.

The micro chemical apparatus according to the present invention comprises a micro chemical apparatus for performing mixing or a reaction involving mixing of raw materials utilizing the phenomenon that raw materials diffuse by molecularly diffusion while they are traveling, comprising:

a channel which is surrounded by a wall and in which raw material inlet ports and outlet ports are formed; and guide walls provided in the above described channel so that the composition of each material to be discharged passing through each outlet port formed in the above described channel is different for every outlet port depending on a material distribution in a plane perpendicular to the direction of travel of raw materials in the above described channel in order to form physical barriers at a region where the material distribution is generated, wherein the plane perpendicular to the direction of travel of raw materials is divided into two or more by the above described guide walls as the outlet ports.

According to the present invention, a product containing less proportion of or no raw materials can be discharged from a discharge channel allocated for taking out a product.

Thus, the present invention can be effective in selectively taking out a desired high purity product or reaction product.

Moreover, the micro chemical apparatus according to the present invention has a construction in which the tip of the above guide wall has a tapered shape, in addition to the above described construction.

This can effectively prevent the materials to be discharged from traveling in the directions different from expectations when they are brought into contact with the thickness part of a guide wall. Accordingly, the present invention can be effective in more effectively separating the materials to be discharged from each other, in addition to the effect by the above described construction.

Moreover, the micro chemical apparatus according to the present invention has a construction comprising a temperature control part for maintaining the temperature of raw materials or a product traveling in the micro chemical apparatus at a desired temperature, in addition to the above described construction.

This can maintain the temperature of raw materials or a product traveling in the micro chemical apparatus at a desired temperature. Accordingly, in addition to the above described effect, the present invention can be effective in always obtaining a product with a constant composition from a discharge channel even in the case of mixing or a reaction involving mixing in which a material distribution changes with temperature.

BRIEF DESCRIPTION OF THE DRAWINGS

The nature of this invention, as well as other objects and advantageous thereof, will be explained in the following with reference to the accompanying drawings, in which like reference characters designate the same or similar parts throughout the figures and wherein.

DETAILED DESCRIPTION OF THE PREFERRED EMBODIMENTS

Embodiments of the present invention will now be described below with reference to FIGS. 1A through 12B.

Figure 1A:
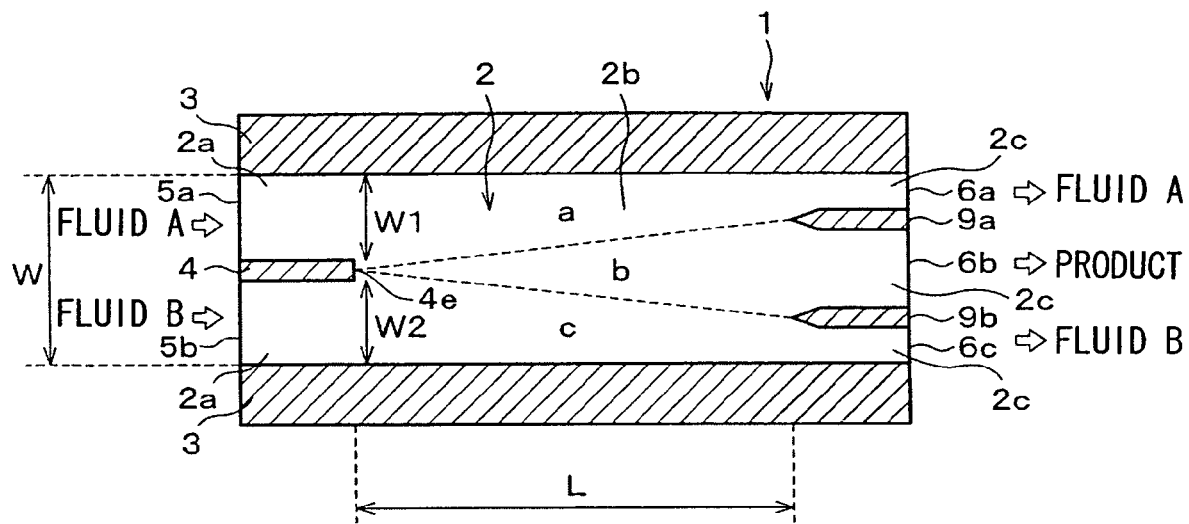
FIG. 1A is a sectional view on arrow showing a construction example of a micro chemical apparatus according to the present invention.
Figure 1B:
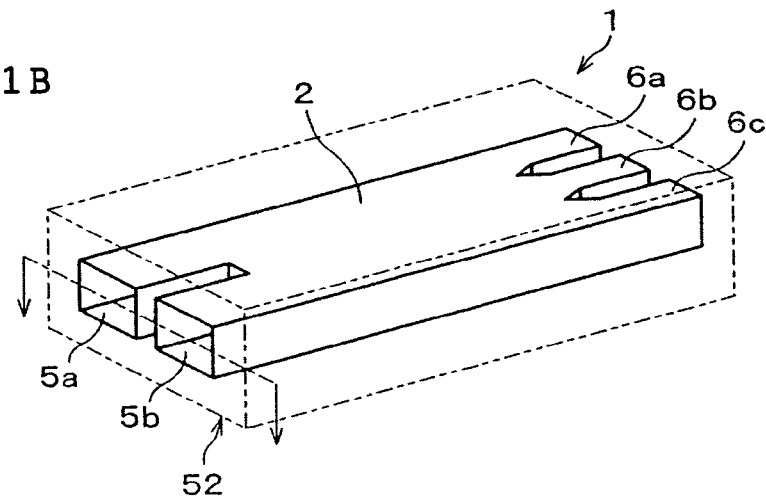
FIG. 1B is a perspective view showing a construction example of a micro chemical apparatus according to the present invention.
Figure 2A:
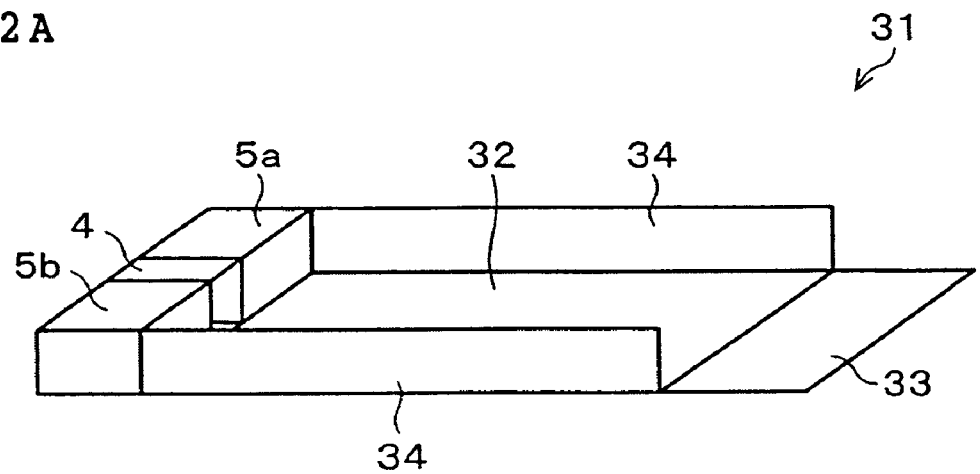
FIG. 2A is a perspective view showing a construction example of a channel lower body.
Figure 2B:
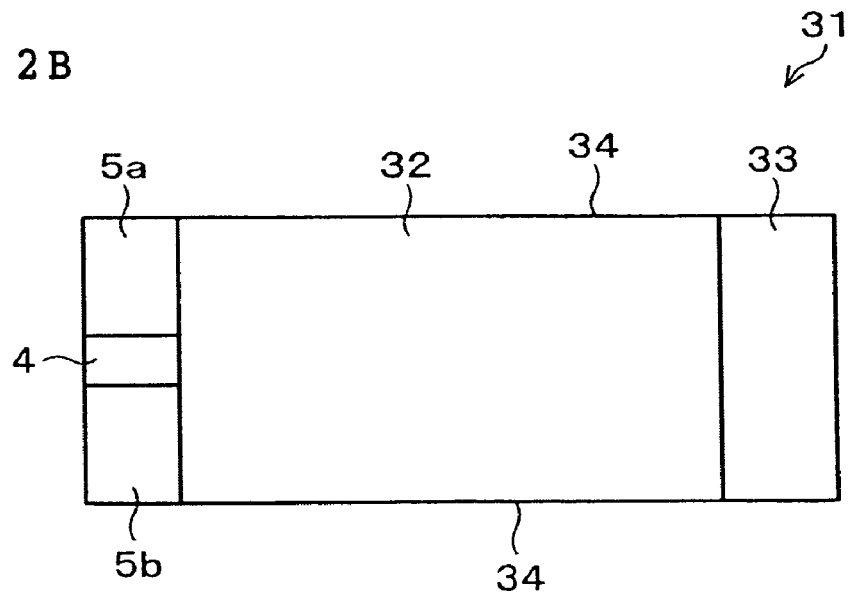
FIG. 2B is a plan view showing a construction example of a channel lower body.

As shown in FIGS. 1A and 1B, the micro chemical apparatus 1 according to the present embodiment is a micro chemical apparatus for performing mixing or a reaction involving mixing raw materials utilizing the phenomenon that raw materials diffuse by molecularly diffusion while they are traveling, and has a structure in which a channel 2 with a generally rectangular shape is surrounded by a side wall 3. As an example of the micro chemical apparatus 1, a channel lower body 31 of FIGS. 2A and 2B is combined with a channel upper body 41 of FIG. 5. The channel lower body 31 comprises a base plate 32, a rear part 33 and a side part 34. The channel upper body 41 comprises a top plate 42 and a side part 43. They are combined such that the base plate 32 of the channel lower body 31 is opposed to the top plate 42 of the channel upper body 41 and the rear part 33 of the channel lower body 31 fits the side part 43 of the channel upper body 41. Variations of this structure will be described hereinafter.

The micro chemical apparatus 1 is placed with the direction toward the front side of the paper in FIG. 1A facing upward.

As shown in FIGS. 1A and 1B, the micro chemical apparatus 1 comprises a plurality of raw material supply channels 2a for supplying a plurality of fluids (A and B) as raw materials, a mixing/reaction channel 2b as a channel for performing mixing and a reaction involving mixing and a plurality of discharge channels 2c for discharging reaction fluids.

The raw material supply channels 2a are partitioned by a supply wall 4 to make raw material inlet ports 5a and 5b at the ends of raw material supply channels 2a, which are openings for charging fluids A and B, respectively.

The micro chemical apparatus 1 has guide walls 9a and 9b, which are physical barriers for dividing the discharge channel 2c into two or more. The guide walls 9a and 9b are walls that are flat, standing in vertical direction (the direction toward the front side of the paper in FIG. 1A) from the base plate 32 of the channel lower body 31 and reach the top plate 42 of the channel upper body 41. Specifically, the guide walls 9a and 9b, which are physical barriers, are provided at a region where fluid A, fluid B as unmixed raw materials and a product are discharged (at the right end of the channel 2 in FIG. 1A) so that only the portion where the fluid A and the fluid B are mixed and allowed to react with each other by the molecular diffusion of the raw materials is discharged. The discharge channels 2c are partitioned by the guide walls 9a and 9b in this manner to make outlet ports 6a, 6b and 6c at the end thereof, which are openings for discharging the fluid A, the product formed from the fluids A and B and the fluid B, respectively.

Thus, in the micro chemical apparatus 1, the raw materials (fluids A and B) enter into the raw material supply channels 2a from the raw material inlet ports 5a and 5b, respectively; travel through the mixing/reaction channel 2b in a given direction of travel, that is, in the direction from the raw material inlet ports toward the outlet ports (in the direction from left to right in FIG. 1A) while they are diffusing by molecularly diffusion in an ordered flow due to a laminar flow; and flow out of the outlet ports 6a and 6c, respectively, provided at both ends of the discharge channels 2c in the direction perpendicular to the direction of travel of the raw materials (in the direction from top to bottom in FIG. 1A). On the other hand, the product flows out of the outlet port 6b provided at the central part of the discharge channels 2c in the direction perpendicular to the direction of travel of the raw materials (in the direction from top to bottom in FIG. 1A).

More specifically, the micro chemical apparatus 1 according to the present embodiment, mixing or a reaction involving mixing is performed utilizing the phenomenon that raw materials diffuse by molecularly diffusion while they are traveling. Accordingly, in the micro chemical apparatus 1, when the fluids A and B, which are raw materials, travel through the mixing/reaction channel 2b in the channel 2, the composition of materials is not uniform in the plane perpendicular to the direction of travel of the raw materials (in the direction from top to bottom in FIG. 1A) by the molecular diffusion of the raw materials, generating a material distribution. In other words, since the type of materials present in the mixing/reaction channel 2b of the channel 2 is different for each of the regions a, b and c which will be described later and regions S1 through S6 (refer to FIG. 9), when the channel 2b is cut by a plane perpendicular to the direction of travel of the fluids, material distributions depending on these regions will appear. This material distribution has a shape partitioned by straight lines (longitudinal stripes) parallel to the width direction (vertical direction in FIG. 1A, a direction vertical to the paper) of the present micro chemical apparatus 1. Thus, the guide walls 9a and 9b which are flat and vertically-standing walls can be made along the boundaries of the material distributions as provided in the present micro chemical apparatus 1.

In the present embodiment, guide walls as physical barriers are placed in a region where the material distributions are generated to divide the above described plane into two or more discharge channels so that the composition of each material to be discharged traveling through each discharge channel is different for every discharge channel depending on the material distribution. This allows the materials to be taken out separately for each composition.

In the present embodiment, the guide walls are positioned so that the composition of either the product or each of the raw materials is maximized in one of the discharge channels depending on the material distribution.

In the present embodiment, the guide walls are positioned so that a discharge channel with a largest proportion of the product among the raw materials and the product can be formed. Specifically, among the three discharge channels 2c, the channel connecting to the outlet port 6b has a largest proportion of the product among fluids A and B and the product.

Moreover, each discharge channel with a largest proportion of each raw material among the raw materials and the product is formed herein by positioning the above described guide walls. Specifically, the discharge channel connecting to the outlet port 6a has a largest proportion of the fluid A among the fluids A and B and the product, and the discharge channel connecting to the outlet port 6c has a largest proportion of the fluid B among the fluids A and B and the product.

Herein, the guide walls are positioned so that a discharge channel containing only the product among the raw materials and the product is formed. Specifically, among the discharge channels 2c, the channel connecting to the outlet port 6b contains only the product among fluids A and B and the product.

Moreover, each discharge channel containing only each raw material among the raw materials and the product is also formed herein by positioning the above described guide walls. Specifically, the discharge channel connecting to the outlet port 6a contains only the fluid A among the fluids A and B and the product, and the discharge channel connecting to the outlet port 6c contains only the fluid B among the fluids A and B and the product.

The operation of the micro chemical apparatus 1 will be briefly described below. Fluids A and B as raw materials are charged in the micro chemical apparatus 1 from the raw material inlet ports 5a and 5b, respectively. As described herein, the guide walls 9a and 9b are provided at a region where fluid A, fluid B as unmixed raw materials and a product are discharged, in such a position that only the portion where the fluid A and the fluid B are mixed and allowed to react by the molecular diffusion of the raw materials is discharged. As a result, only the product is present in the range surrounded by the two guide walls, and it can be selectively taken out of the outlet port 6b. Thus, a desired high purity product or reaction product can be selectively taken out.

More particularly, an example will be described below. FIG. 1 shows an example with two raw materials and two guide walls.

The fluid A as a raw material is charged from the raw material inlet port 5a. The fluid B as a raw material is charged from the raw material inlet port 5b. The fluid A diffuses into regions a and b by molecular diffusion. The fluid B diffuses into regions b and c by molecular diffusion. In other words, the region a is a region where only the fluid A is present; the region c is a region where only the fluid B is present; and the region b is a region where all raw materials, that is, both of the fluid A and the fluid B, are present.

The guide wall 9a is placed so that the tip thereof is at the boundary between the region a and the region b. The guide wall 9b is placed so that the tip thereof is at the boundary between the region c and the region b. Accordingly, the unmixed/unreacted fluid A is discharged from the outlet port 6a. The product is discharged from the outlet port 6b. The unmixed/unreacted fluid B is discharged from the outlet port 6c.

Incidentally, for example, when the fluid A and the fluid B are mixed and allowed to react to obtain the product C, A may be mixed with C in the micro chemical apparatus if A is easily separated from C. A guide wall may be provided so as to prevent B from mixing with C.

Incidentally, in some cases only mixing is performed and in other cases mixing involving chemical reaction is performed, in the micro chemical apparatus. The micro chemical apparatus according to the present embodiment can be used similarly either in the case of only mixing or in the case involving chemical reaction.

Incidentally, the micro chemical apparatus may be configured so that the shapes, numbers and positions of the outlet channels 2c can be changed in response to the state of mixing or reaction.

Moreover, the micro chemical apparatus can be configured so that the equivalent diameter of each raw material supply channel 2a at the confluence of the above raw material supply channel 2a and the mixing/reaction channel 2b, that is, the equivalent diameter at the tip 4e of the supply wall shown as W1 and W2 in the figure is, for example, from 1 μm to 1,000 μm.

The processing technique for actually producing such a micro chemical apparatus may include special precision machining technique such as photolithoetching, hyperfine electric discharge machining, light molding and machining technique using a general purpose lathe and a drilling machine.

The materials for use in the micro chemical apparatus may include metals (iron, aluminum, stainless steel, titanium and various alloys), resins (fluororesin and acrylic resin), and glass (silicon and quartz).

The fluids to be supplied include liquid, gas, solid-liquid mixtures in which metal fine particles are dispersed in liquid, solid-gas mixture in which metal fine particles are dispersed in gas, and gas-liquid mixtures in which gas is dispersed in liquid without being dissolved. The fluids to be supplied also include not only those with different types of fluid or different chemical compositions, but also those with, for example, different conditions such as temperature and solid-liquid ratio.

The reactions that can be applied may include various reaction forms such as an ionic reaction, an oxidation-reduction reaction, a thermal reaction, a catalytic reaction, a radical reaction and a polymerization reaction, for inorganic materials and organic materials.

Variations of the shape, number and position of the micro chemical apparatus 1 will be described. The shape, number and position of the raw material inlets 5a and 5b and the outlet ports 6a, 6b and 6c can be changed by combining various channel upper bodies 41 with various channel lower bodies 31. The channel lower body 31 has variations as shown, for example, in FIGS. 2A and 2B through FIGS. 4A and 4B. The channel upper body 41 has variations as shown, for example, in FIG. 5 through FIG. 8. Note that the thickness of each part is omitted in these figures. A combination of the channel lower body 31 in FIGS. 2A and 2B with the channel upper body 41 in FIG. 5 is the basic combination.

Figure 3A:
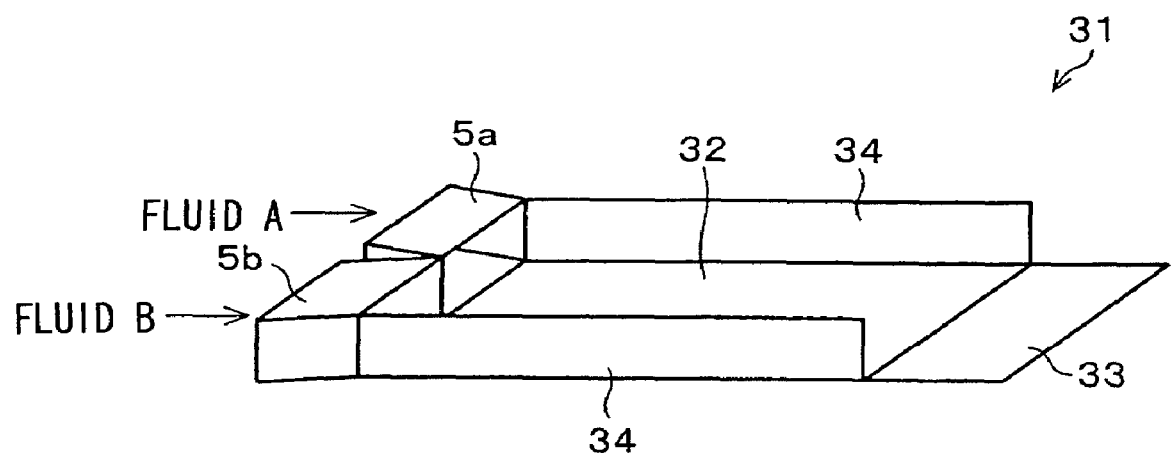
FIG. 3A is a perspective view showing a construction example of a channel lower body.
Figure 3B:
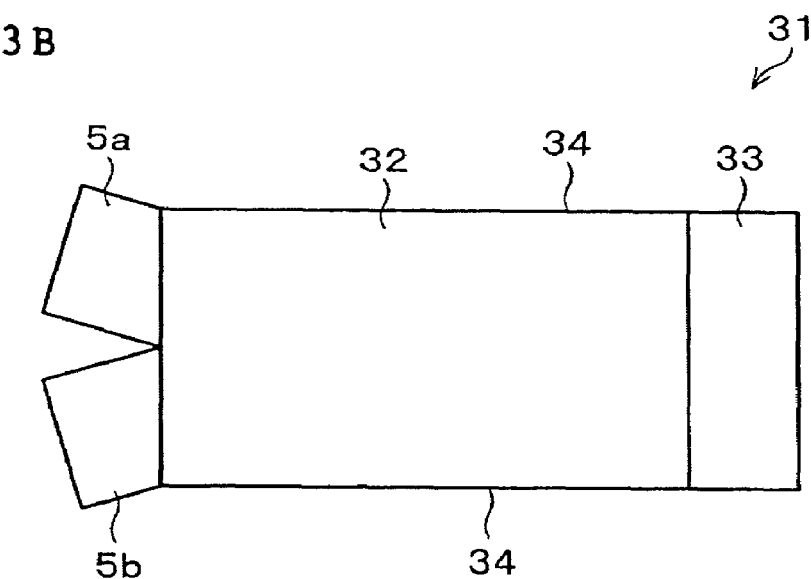
FIG. 3B is a plan view showing a construction example of a channel lower body.
Figure 4A:
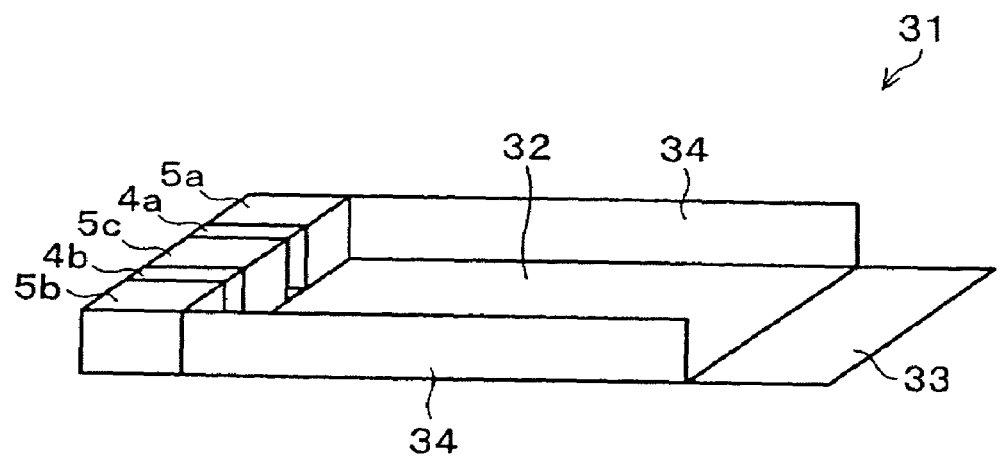
FIG. 4A is a perspective view showing a construction example of a channel lower body.
Figure 4B:
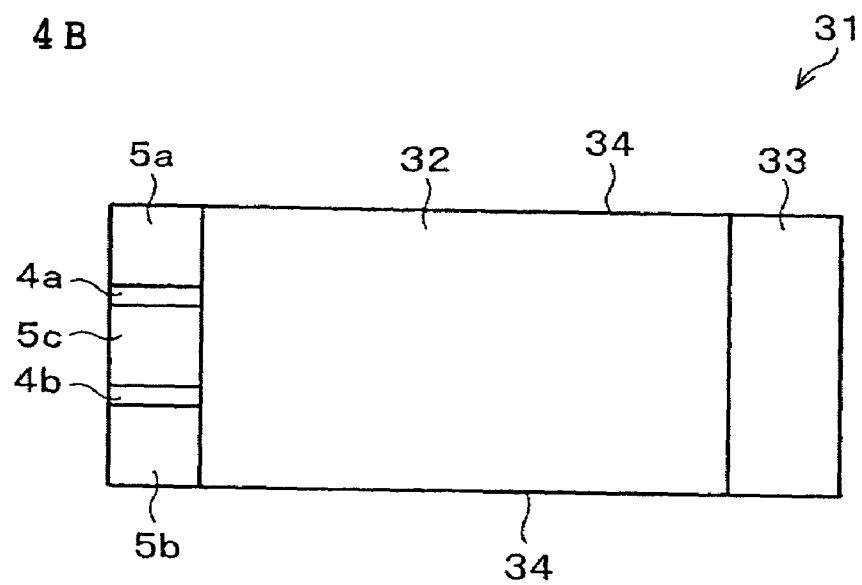
FIG. 4B is a plan view showing a construction example of a channel lower body.

FIGS. 3A and 3B show inlet ports 5a and 5b, which serve as the entrance for the fluid A and the fluid B as raw materials, positioned with a certain angle to each other. FIGS. 4A and 4B show three inlet ports 5a, 5b and 5c, which serve as the entrance for the fluid A and the fluid B as raw materials.

Figure 5:
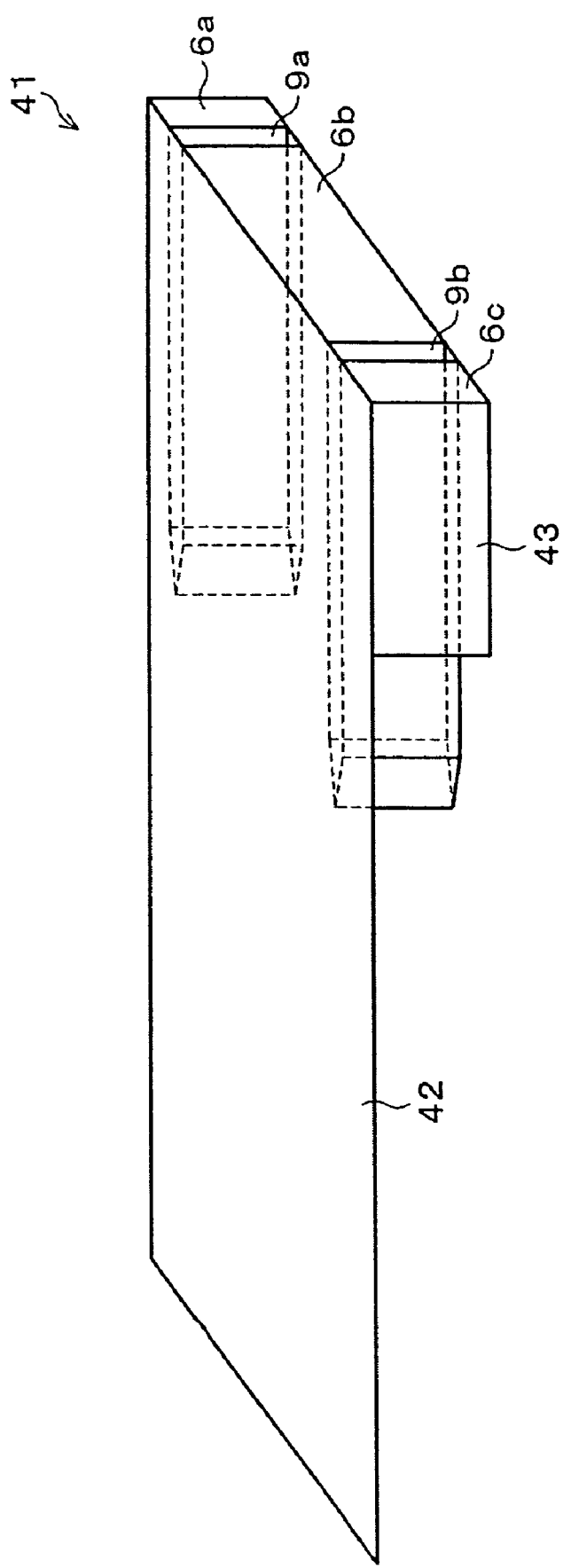
FIG. 5 is a perspective view showing a construction example of a channel upper body.
Figure 6:
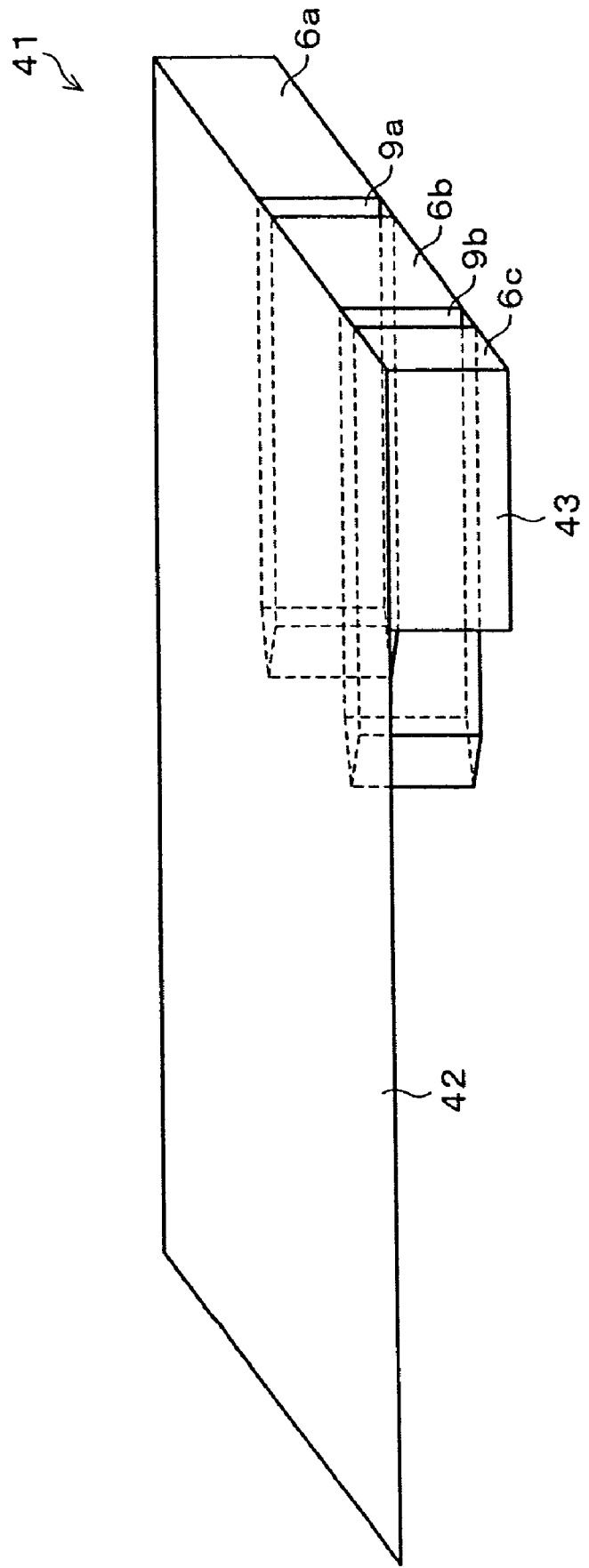
FIG. 6 is a perspective view showing a construction example of a channel upper body.
Figure 7:
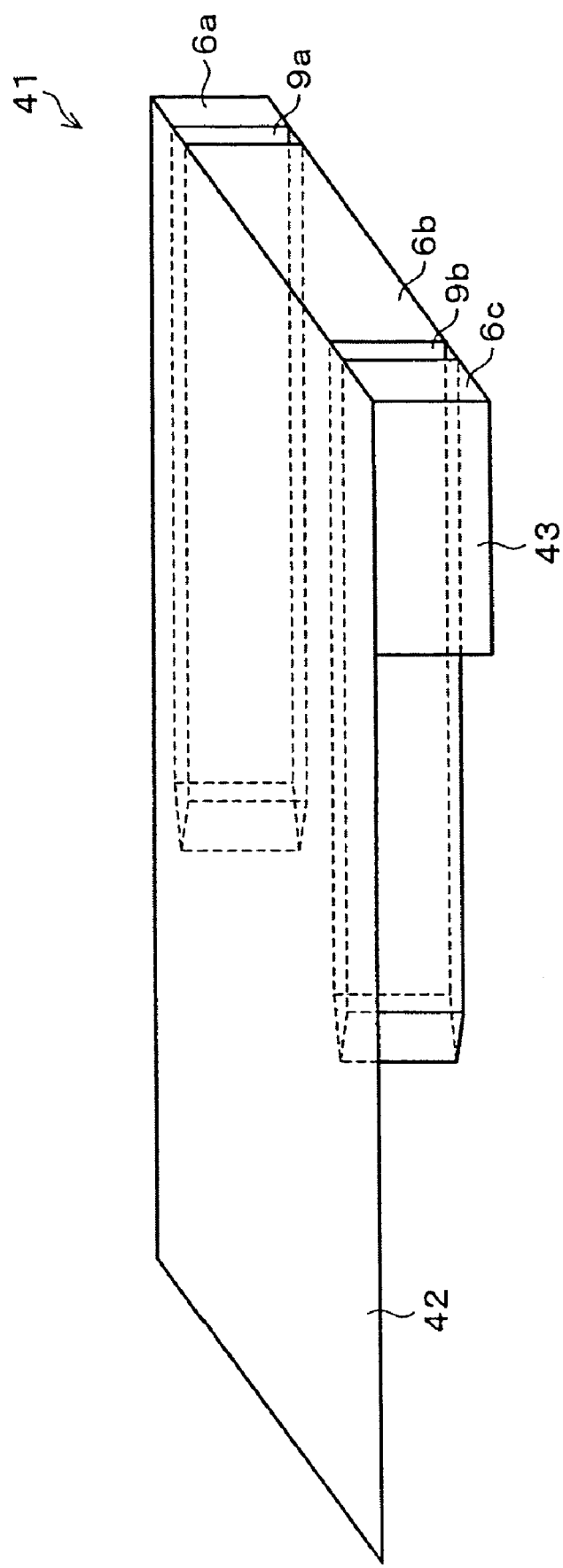
FIG. 7 is a perspective view showing a construction example of a channel upper body.
Figure 8:
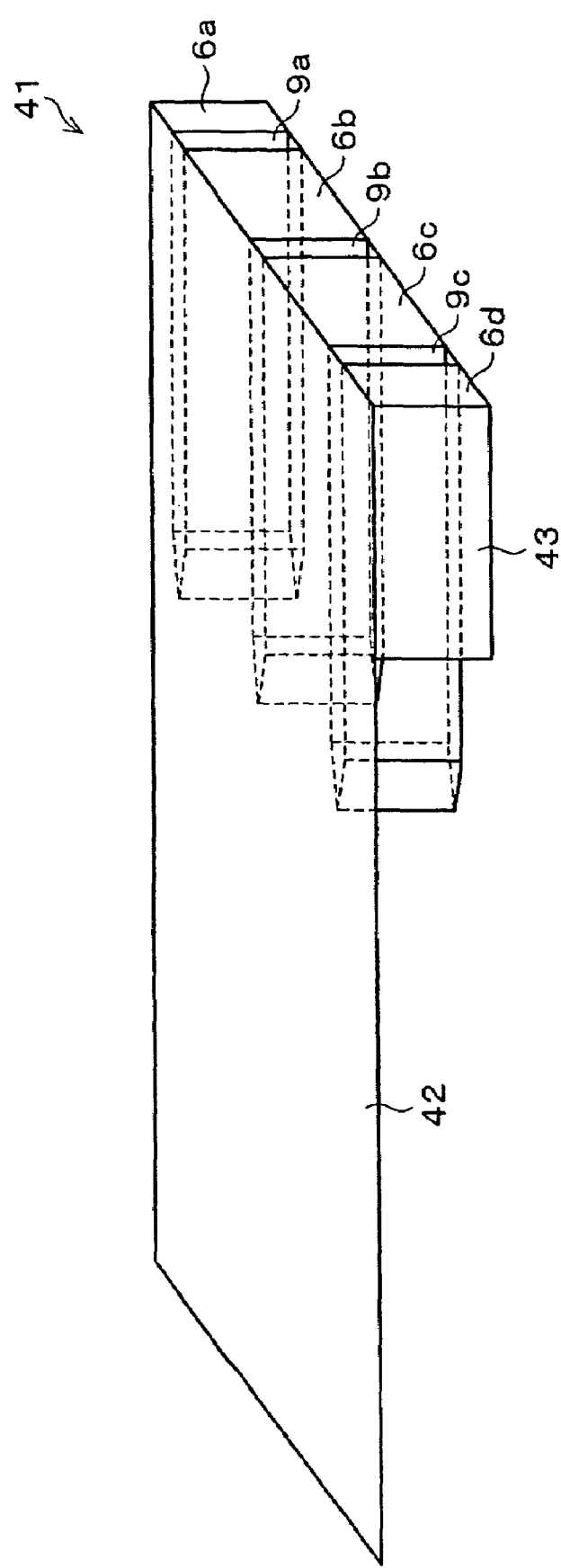
FIG. 8 is a perspective view showing a construction example of a channel upper body.

FIG. 6 shows the outlet ports 6a, 6b and 6c with channel widths different from those in FIG. 5. Here, 6a and 6c are wider and 6b is smaller. FIG. 7 shows the mixing/reaction channel 2b with a shorter length than that in FIG. 5 by changing the length of the guide walls. FIG. 8 shows four outlets 6a, 6b, 6c and 6d.

Figure 9:
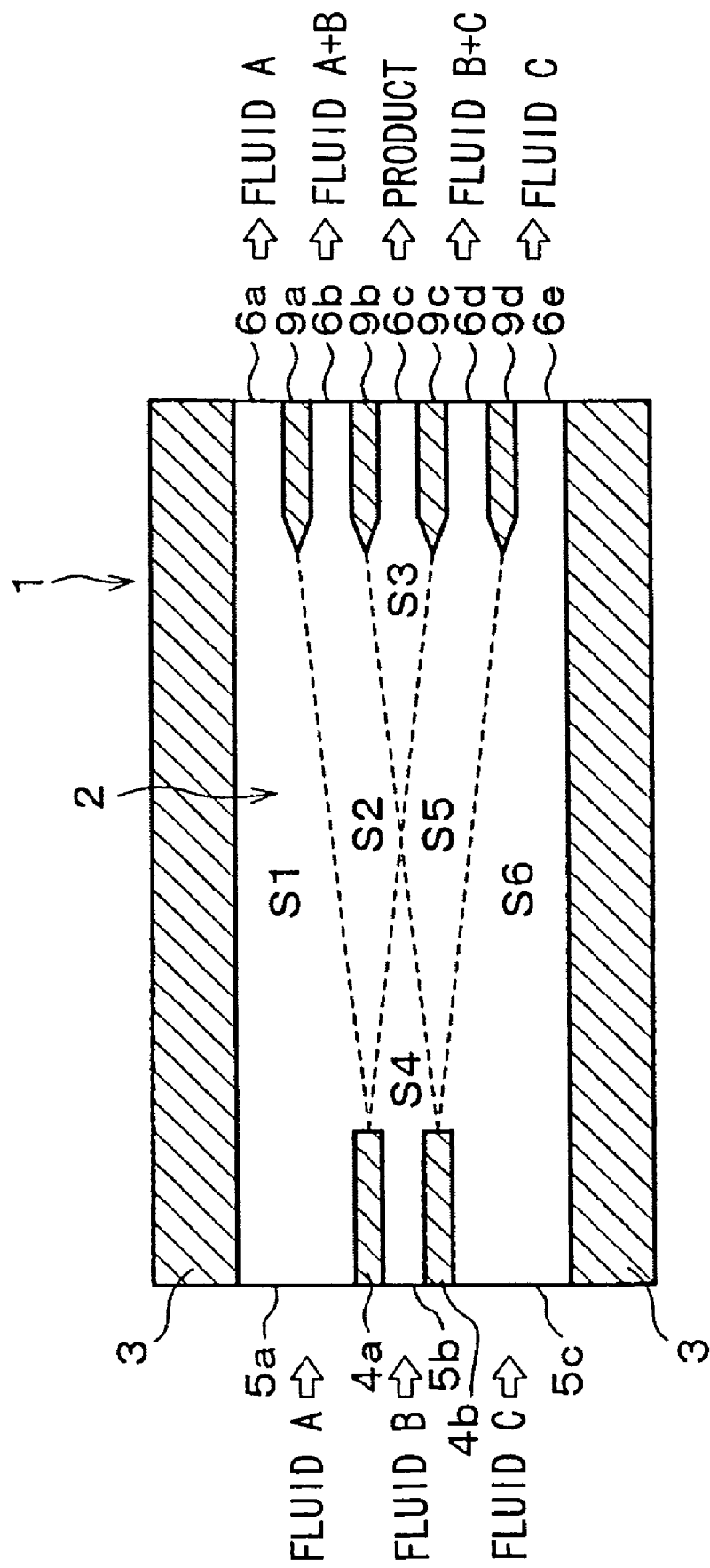
FIG. 9 is a sectional view showing another construction example of a micro chemical apparatus according to the present invention.

FIG. 9 shows an example with three raw materials, five materials to be discharged and four guide walls. The channel lower body 31 may be that shown in FIGS. 4A and 4B. Further, the channel upper body 41 may be that with five outlet ports 6a, 6b, 6c, 6d and 6e similar to the example shown in FIG. 8.

In this example, the above described guide walls are positioned so that a discharge channel, in which the proportion of the product among the raw materials and the product is the largest, can be formed. Specifically, in the discharge channel connecting to the outlet port 6c provided in the central part in the direction perpendicular to the direction of travel of raw materials (in the direction from top to bottom in FIG. 9) among the five discharge channels, the proportion of the product is the largest among the fluids A, B and C and the product.

Moreover, here, in the discharge channel connecting to the outlet port 6a provided in one end in the direction perpendicular to the direction of travel of raw materials (in the direction from top to bottom in FIG. 9) among the discharge channels, the proportion of the fluid A is the largest among the fluids A, B and C and the product; and in the discharge channel connecting to the outlet port 6e provided in the other end in the direction perpendicular to the direction of travel of raw materials (in the direction from top to bottom in FIG. 9) among the discharge channels, the proportion of the fluid C is the largest among the fluids A, B and C and the product.

In addition, here, the above described guide walls are positioned so that a discharge channel, in which only the product among the raw materials and the product is contained, can be formed. Specifically, in the discharge channel connecting to the outlet port 6c among the discharge channels, only the product is contained among the fluids A, B and C and the product.

Moreover, here, in the discharge channel connecting to the outlet port 6a, only the fluid A is contained among the fluids A, B and C and the product; and in the discharge channel connecting to the outlet port 6e, only the fluid C is contained among the fluids A, B and C and the product.

The fluid A as a raw material is charged from the raw material inlet port 5a. The fluid B as a raw material is charged from the raw material inlet port 5b. The fluid C as a raw material is charged from the raw material inlet port 5c. The fluid A spreads to regions S1, S2 and S3 by molecular diffusion. The fluid B spreads to regions S4, S2, S5 and S3 by molecular diffusion. The fluid C spreads to regions S6, S5 and S3 by molecular diffusion. In other words, the region S1 is a region where only the fluid A is present; the region S4 is a region where only the fluid B is present; the region S6 is a region where only the fluid C is present; the region S2 is a region where only the fluids A and B are present; the region S5 is a region where only the fluids B and C are present; and the region S3 is a region where all raw materials, that is, the fluids A, B and C are present.

The guide wall 9a is placed so that the tip thereof is positioned at the boundary of the region S1 and the region S2. The guide wall 9b is placed so that the tip thereof is positioned at the boundary of the region S2 and the region S3. The guide wall 9c is placed so that the tip thereof is positioned at the boundary of the region S3 and the region S5. The guide wall 9d is placed so that the tip thereof is positioned at the boundary of the region S5 and the region S6. Accordingly, the unmixed/unreacted fluid A is discharged from the outlet 6a. The unmixed/unreacted fluid A and the unmixed/unreacted fluid B are discharged from the outlet 6b. The product is discharged from the outlet 6c. The unmixed/unreacted fluid B and the unmixed/unreacted fluid C are discharged from the outlet 6d. The unmixed/unreacted fluid C is discharged from the outlet 6e.

The fluid A and the fluid C, which are discharged from the outlet ports 6a and 6e respectively, may be reused as raw materials as they are. The mixture of the fluids A and B and the mixture of the fluids B and C, which are discharged from the outlet ports 6b and 6d respectively, may be reused as raw materials after they are separated. Incidentally, solely in terms of obtaining the product, it is unnecessary to provide the outlet ports 6a and 6b separately and the outlet ports 6d and 6e separately. Thus, in this case, only the two guide walls in the central part of the discharge channels, that is, 9b and 9c, may be provided.

The shape, number and position of the micro chemical apparatus, the guide walls, the channel upper body, and the channel lower body can be determined by inputting fluid characteristic parameters such as density, viscosity, specific gravity, specific heat, thermal conductivity, diffusion coefficient, reaction rate constant and heat of reaction specific to the fluid, and operation parameters such as flow velocity, temperature and pressure and calculating with numerical hydrodynamic simulation software. FLUENT (trade mark) and the like can be used as the numerical hydrodynamic simulation software. With regard to the shape of the micro chemical apparatus 1, for example, the length L from the tip 4e of the supply wall 4 to the end of the outlet ports 6a, 6b and 6c along the direction of travel of raw materials, the width W of the mixing/reaction channel 2b, the equivalent diameters W1 and W2 of each raw material supply channel 2a at the confluence of the raw material supply channel 2a and the mixing/reaction channel 2b as described above and the like, in the micro chemical apparatus 1 as shown in FIG. 1, may be determined.

Figure 10:
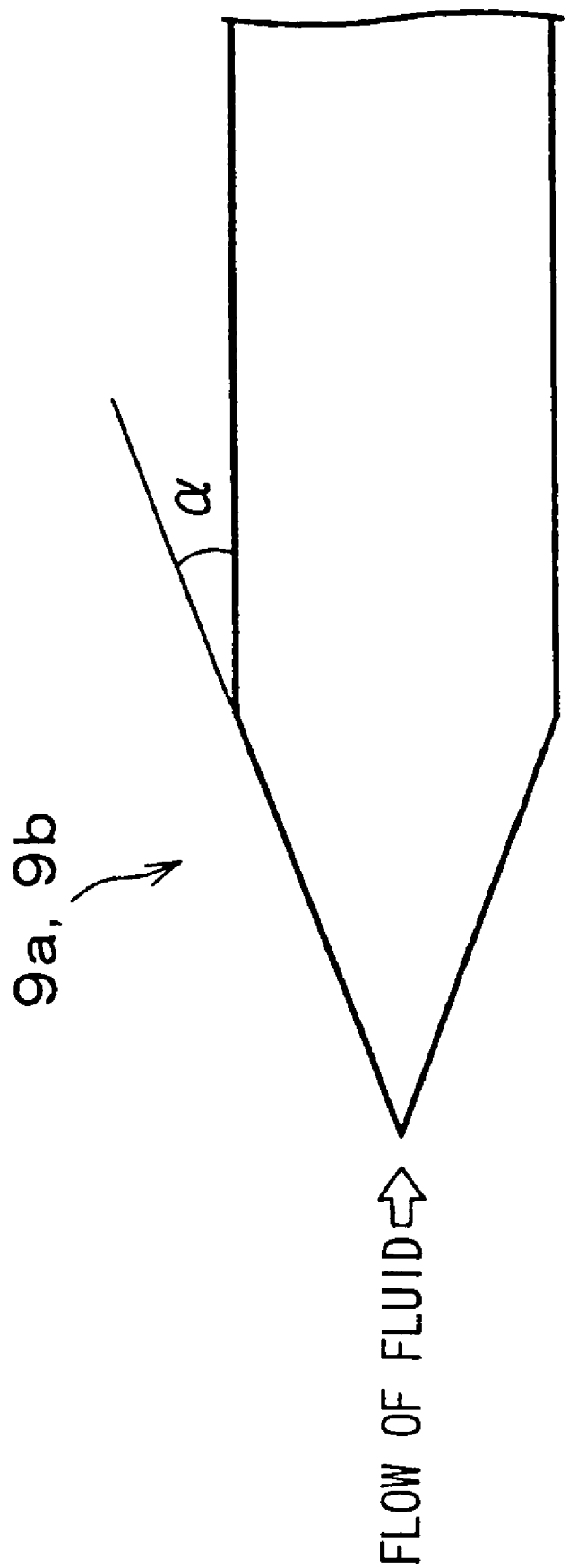
FIG. 10 is a plan view showing a construction example of a guide wall.
Figure 11:
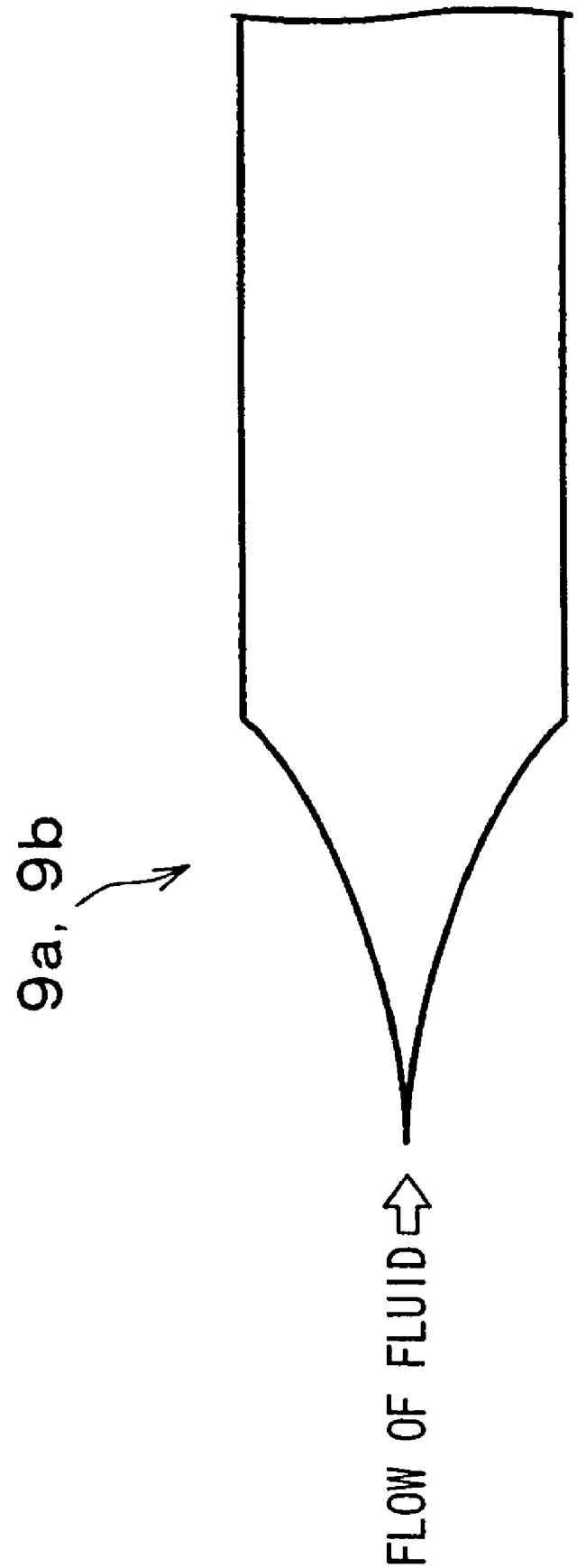
FIG. 11 is a plan view showing another construction example of a guide wall.

The tip of the guide walls 9a and 9b may be flat or may be of tapered shape (knife edge structure) as shown in FIGS. 10 and 11. Note that in FIGS. 10 and 11 the directions from left to right and from top to bottom are the same as in FIG. 1A. Specifically, the fluids flow from left in FIGS. 10 and 11, and the direction toward the front side of the paper is the upward direction in FIGS. 10 and 11, as in FIG. 1A. FIG. 10 shows an example in which the tip has congruent triangles at any height position when viewed from above. FIG. 11 shows an example in which the tip has a shape formed by scooping out cylindrical parts when viewed from above. Examples of FIGS. 5 through 8 adopt the shape shown in FIG. 10.

The shape may be any shape that does not generate vortex or stagnation of fluids. Such a knife edge structure can effectively prevent the materials to be discharged from traveling in the directions different from expectations when they are brought into contact with the thickness part of the guide walls, thereby capable of effectively separating the materials to be discharged from each other. Accordingly, the smaller angle indicating the degree of the acute angle of the tip, which is indicated by the angle $\alpha$ in FIG. 10, is the better. The tip may also be round to the extent the vortex of the fluids is not generated.

Moreover, the micro chemical apparatus may be configured such that a temperature control part is provided for controlling the temperature of the fluids flowing in the above described raw material supply channel 2a, the mixing/reaction channel 2b and the discharge channel 2c. This temperature control part will maintain the temperature of the raw materials or the product traveling in the micro chemical apparatus at desired temperatures. As the temperature control part, a jacket may be provided through which a heating medium (liquid such as oil and water and the like) can flow, or an electric heater may be provided. The jacket or the like for the reaction mixing part may be split into two or more in order to control the temperature more precisely.

Figure 12A:
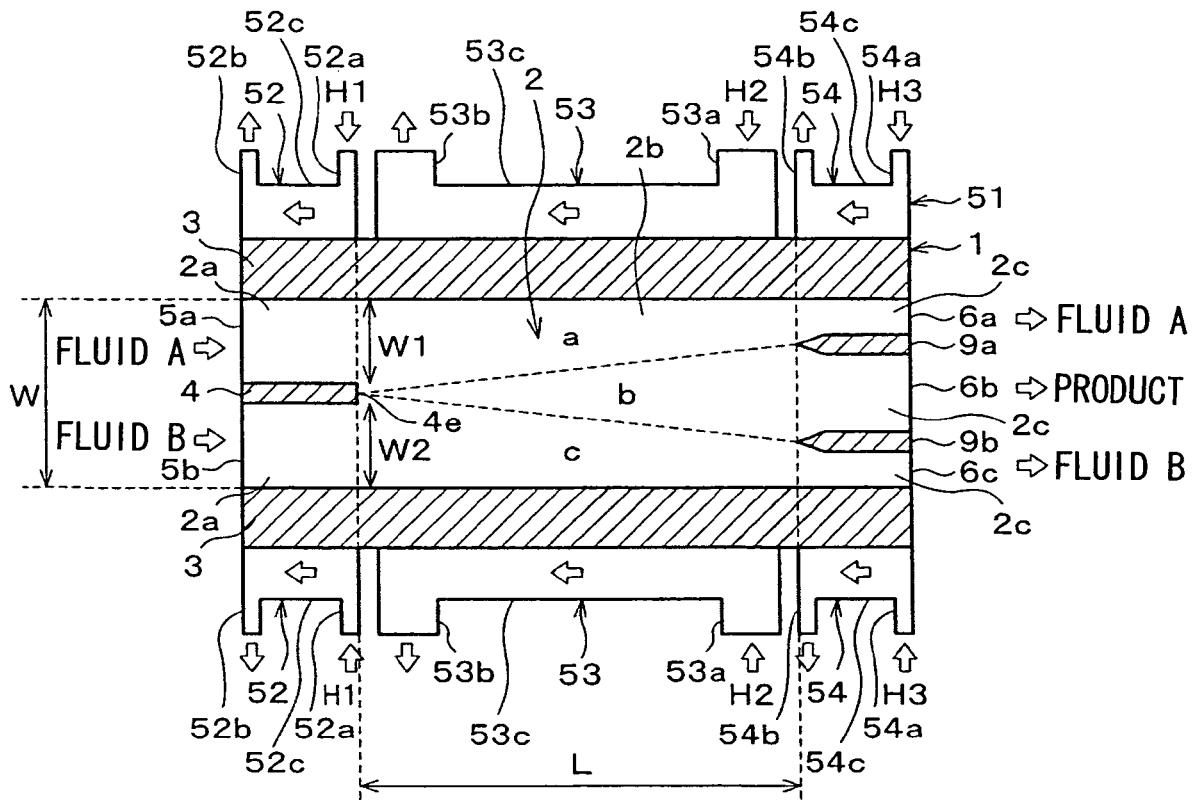
FIG. 12A is a sectional view on arrow showing a further construction example of a micro chemical apparatus according to the present invention.
Figure 12B:
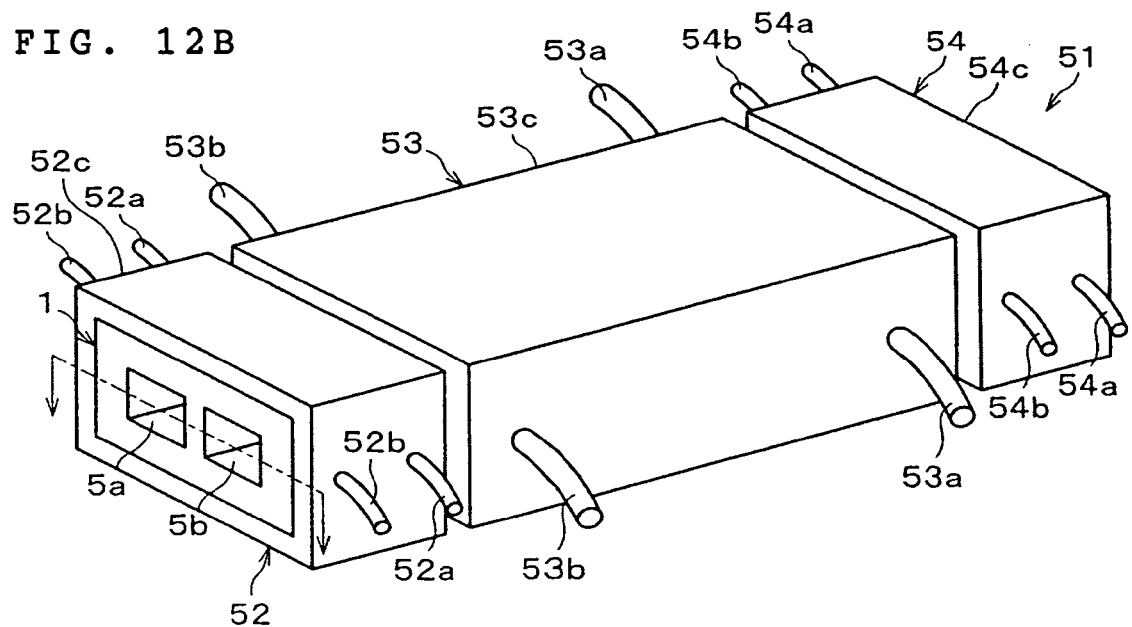
FIG. 12B is a perspective view showing a further construction example of a micro chemical apparatus according to the present invention.
Figure 13A:
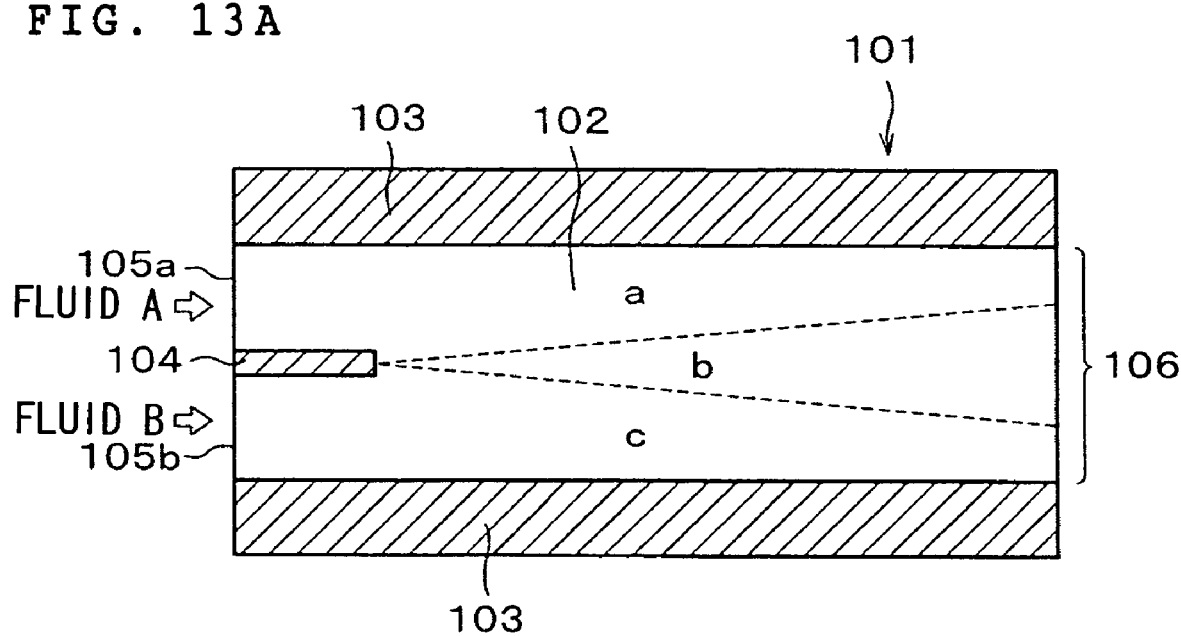
FIG. 13A is a sectional view on arrow showing a construction example of a conventional micro chemical apparatus.
Figure 13B:
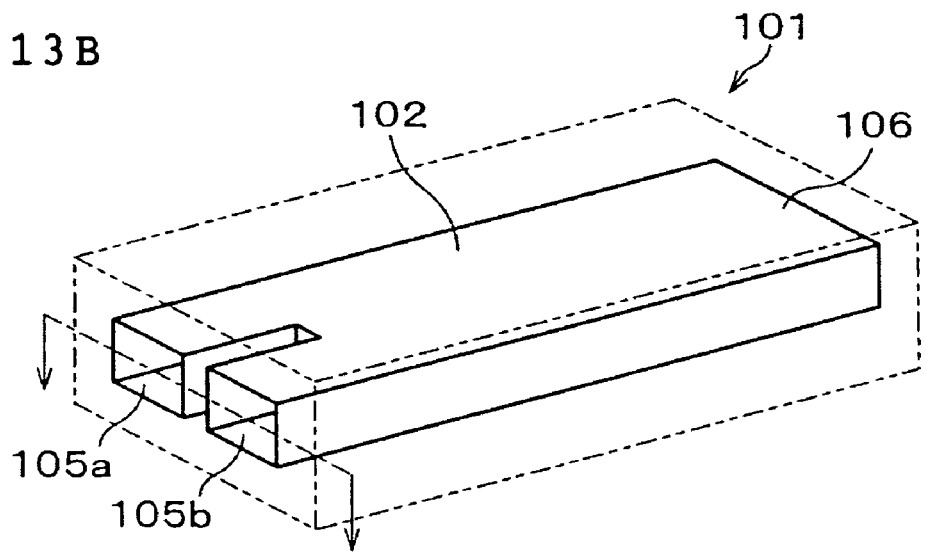
FIG. 13B is a perspective view showing a construction example of a conventional micro chemical apparatus.

Specifically, for example, the micro chemical apparatus 1 is covered by a jacket 51 as shown in FIGS. 12A and 12B. The jacket 51 is divided into a front part 52, an intermediate part 53 and a rear part 54, which covers the raw material supply channel 2a, the mixing/reaction channel 2b and the discharge channel 2c, respectively. Alternately, the jacket 51 may be of a shape in which a front part, an intermediate part and a rear part are connected.

The front part 52 comprises a heating medium supply pipe 52a, a heating medium discharge pipe 52b and an insulating pipe 52c therebetween. A heating medium H1 with a predetermined temperature, which is fed through the heating medium supply pipe 52a, warms up each of the fluids A and B traveling in the channel 2 in the micro chemical apparatus 1 by heat conduction through the insulating pipe 52c and is discharged from the heating medium discharge pipe 52b.

Similarly, the intermediate part 53 comprises a heating medium supply pipe 53a, a heating medium discharge pipe 53b and an insulating pipe 53c therebetween. A heating medium H2 with a predetermined temperature, which is fed through the heating medium supply pipe 53a, warms up each of the fluids A and B and the product traveling in the channel 2 in the micro chemical apparatus 1 by heat conduction through the insulating pipe 53c and is discharged from the heating medium discharge pipe 53b.

Similarly, the rear part 54 comprises a heating medium supply pipe 54a, a heating medium discharge pipe 54b and an insulating pipe 54c therebetween. A heating medium H2 with a predetermined temperature, which is fed through the heating medium supply pipe 54a, warms up each of the fluids A and B and the product traveling in the channel 2 in the micro chemical apparatus 1 by heat conduction through the insulating pipe 54c and is discharged from the heating medium discharge pipe 54b.

As a result, the temperature of the fluids A and B and the product traveling in the channel 2 of the micro chemical apparatus 1 can be maintained at desired temperatures.

In the construction in which the jacket is split into the front part 52, the intermediate part 53 and the rear part 54, the heating media H1 through H3 may be of the same material or may be of different materials. In addition, the temperature may be the same or different, which may be set appropriately depending on the conditions of mixing and reaction.

The micro chemical apparatus according to the present invention comprising supply channels for supplying a plurality of fluids, a mixing/reaction channel and a plurality of discharge channels for discharging reaction fluids may be configured such that the micro chemical apparatus has guide walls for splitting the discharge channel into two or more so as to make it possible to change the shape, number and position of the discharge channels tailored to the conditions of mixing and reaction.

Further, the micro chemical apparatus may be configured such that the tip of the above described guide walls has a knife edge structure.

Further, the micro chemical apparatus may be configured such that the equivalent diameter of each supply channel at the confluence of the above supply channel and the reaction channel is from 1 μm to 1,000 μm.

Further, the micro chemical apparatus may be configured such that a temperature control device is provided for controlling the temperature of the fluids flowing in the supply channels, the reaction channel and the discharge channels as above described.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A micro chemical apparatus comprising:
   a channel defined by a top wall, a bottom wall and opposing side walls, the channel having raw material inlet ports and outlet ports; and
   guide walls provided in a part of the channel in the direction of travel of raw materials input through the raw material inlet ports so that a composition of each material to be discharged passing through each outlet port formed in the channel is different for every outlet port depending on a material distribution in a horizontal plane perpendicular to the direction of the travel of the raw materials in the channel in order to form physical barriers at a region where the material distribution is generated,
   wherein the horizontal plane perpendicular to the direction of travel of the raw materials is divided into two or more by the guide walls as the outlet ports,
   wherein, within another part of the channel where the guide walls are not provided, the material distribution comprises the raw materials as unmixed and a product or a mixture of the raw materials, and the guide walls are configured such that the raw materials and the product or the mixture of the raw materials are separately discharged through different outlet ports,
   wherein the guide walls extend from the top wall to the bottom wall and are horizontally displaced from each other.

2. The micro chemical apparatus according to claim 1, wherein the tip of the guide wall has a tapered shape.

3. The micro chemical apparatus according to claim 1, comprising a temperature control part which maintains the temperature of raw materials or a product traveling in the micro chemical apparatus at a desired temperature.

4. The micro chemical apparatus according to claim 2, comprising a temperature control part which maintains the temperature of the raw materials or the product traveling in the micro chemical apparatus at a desired temperature.

* * * * *